Dec. 29, 1953   P. M. HOLLINGSWORTH   2,664,372
ELECTRIC CABLE
Filed Dec. 23, 1947   10 Sheets-Sheet 1

Inventor
P. M. Hollingsworth
By John A. Seifert
Attorney

Dec. 29, 1953     P. M. HOLLINGSWORTH     2,664,372
ELECTRIC CABLE
Filed Dec. 23, 1947                        10 Sheets-Sheet 2

Inventor
P. M. Hollingsworth
By John A. Seifert
Attorney

Inventor
P. M. Hollingsworth
By John A. Seifert
Attorney

Dec. 29, 1953 P. M. HOLLINGSWORTH 2,664,372
ELECTRIC CABLE
Filed Dec. 23, 1947 10 Sheets-Sheet 7

Inventor
P. M. Hollingsworth
By John A. Seifert
Attorney

Dec. 29, 1953  P. M. HOLLINGSWORTH  2,664,372
ELECTRIC CABLE
Filed Dec. 23, 1947                                      10 Sheets-Sheet 9

Inventor
P. M. Hollingsworth
By John A. Seifert
Attorney

Dec. 29, 1953     P. M. HOLLINGSWORTH     2,664,372
ELECTRIC CABLE
Filed Dec. 23, 1947                                10 Sheets-Sheet 10

Inventor
P. M. Hollingsworth
By John A. Seifert
Attorney

Patented Dec. 29, 1953

2,664,372

UNITED STATES PATENT OFFICE 2,664,372

ELECTRIC CABLE

Philip Massey Hollingsworth, Sidcup, Kent, England, assignor to Johnson and Phillips Limited, London, England, a British company Application December 23, 1947, Serial No. 793,508

Claims priority, application Great Britain July 14, 1947

4 Claims. (Cl. 154—2.26)

The invention relates to the construction of electric cables, the conductor or conductors of which may be insulated with any appropriate material as, for example, rubber, varnished cotton cloth or oil impregnated paper.

Such cables are frequently, and in the case of the last named type of insulation, almost invariably, provided with a continuous metallic sheathing the functions of which are to seal the insulating material from contact with moisture, to afford mechanical protection and to confine the electrical potential.

For this purpose, the use of lead and lead alloys is and has been common practice owing to the unique physical nature of these metals which enables them to be readily and directly applied to the aforementioned types of cable by the extrusion process.

The benefit of easy extrusion has been a major factor in outweighing certain disadvantageous characteristics of lead and its alloys, principally their relatively poor mechanical strength and their high specific gravity.

The present invention has for its object provision of an improved method by which a sheathing of a metal such as, for example, the so-called commercially pure aluminium (aluminium content above 99.0%) the so-called super-purity aluminium (99.99%), zinc, copper or alloys of such metals, which possess greatly superior mechanical strength to that of lead or lead alloys, may be applied to an insulated cable core.

Such metals, by virtue of their greater hardness and high melting points, cannot easily be directly extruded on to a cable core, partly owing to the very high pressures required, which involve special and expensive types of extrusion machines, and partly because of the elevated extrusion temperatures required, which are highly detrimental to most insulating materials.

It is known however that the extrusion method has been investigated with aluminium as also has an alternative method consisting in the application of a fabricated sheathing formed of longitudinally or helically wrapped aluminium strip with welded seams.

The method according to the present invention is designed to avoid the difficulties of the extrusion process and the dissymmetry and non-uniformity of the welded seam. The invention consists broadly in the method according to which the cable core is first threaded into a previously formed tube of the required metal which is of a diameter larger than the required diameter of the finished sheathing, and said tube is subsequently reduced or sunk to said required diameter.

According to a preferred embodiment of the invention the process involves, as the first stage, the production of a seamless tube formed, for example, in aluminium or like metal by any suitable means such as extrusion, drawing or by a combination of such processes. The operation may also include annealing or other measures necessary to secure desired physical properties in the finished sheathing.

In the second stage of the process the insulated cable core is threaded or inserted into the aforementioned tube, and, to enable this to be done, the tube is so formed to have its internal diameter greater by a certain amount than the overall diameter of the insulated cable core, and to have its length correspondingly shorter than that of the insulated cable core, so that the total volume of the tube is precisely equal to that required for the finished sheathing of the designed thickness and internal diameter.

The minimum amount of clearance to be allowed to permit satisfactory insertion of the cable core varies somewhat with the size of cable, but in general lies between 5% and 15% of the internal diameter of the tube. The maximum amount of clearance is governed by the degree of final reduction from the tube to the finished sheath which is found to be expedient and this will depend upon the characteristics of the metal used for sheathing. In practice it is found that one diameter of tube will cover a wide range of core sizes; in 99.6% aluminum, for example, reductions in diameter of the order of 50% are practicable.

For the purpose of being threaded into the tube, one end of the cable core, which may be coiled on a drum free to rotate, may be prepared according to common usage, by fixing by efficient means a suitable haulage attachment to the conductor or conductors to which may be attached a line, wire or chain previously threaded through the tube.

The operation of threading in the cable core is preferably carried out with the tube in a straight run and by suitable mechanical means which may be assisted if necessary by lubricants such as French chalk or mineral insulating oil applied to the cable core or by applying to the latter a helical wrapping of material having a low frictional coefficient.

The final stage of the process consists in passing the tube containing the cable through one or more suitably dimensioned reducing dies or other swaging device, with the object of reducing and lengthening the tube and thereby producing a continuous, uniform and accurately fitting sheathing covering the entire length of cable and affording the required thickness and internal diameter.

Concurrently with or subsequent to the final stage of the process, the completed cable may be formed into a coil or reeled on to a drum of suitable barrel diameter.

If it is found necessary to modify the properties of the sheathing so formed, and where the type of cable insulation employed admits, annealing or similar process may subsequently be carried out on the sheathed cable.

In order that the invention may be the more clearly understood, a number of processes in accordance therewith will now be described, reference being made to the accompanying drawings wherein:

Figure 16 is a side elevation; and

Figure 19 is a side elevation; and

Describing now, with reference to Figures 1 to 14 the first of said processes, an aluminium tube T (Figures 11, 13 and 14) with which the cable core C (Figures 13 and 14) is to be sheathed is wound off a drum 1 (Figure 1) and its leading end is drawn, by hand or other suitable means, first through a tube-straightening machine 2 and then through an electro-magnetic tow-line-threading device 3. The tube-straightening device 2 is more particularly illustrated in Figure 2 and will be further described hereinafter. Its function is to straighten the tube. The electro-magnetic tow-line-threading device 3 is more particularly illustrated in Figure 3. It comprises a solenoid surrounding a circular section passageway 5 and adapted to be supplied with current from a direct current generator 6 and to generate a powerful magnetic field in the passageway 5. The aluminium tube T is passed completely through this passageway 5 of the device 3 and then over a roller guide 7 which is located just forwardly of said device 3.

When the leading end of the tube T is over the guide 7 said tube is stopped and a magnet armature device 8 (Figure 4) or 8a (Figure 5) is inserted into the forward end of the tube with the end of a core tow-line L1 (Figures 11 and 13) attached to it, said armature device being pushed in until it lies within the region of the passageway 5 and is therefore subject to the magnetic field of the solenoid.

Figures 3, 4, 5:
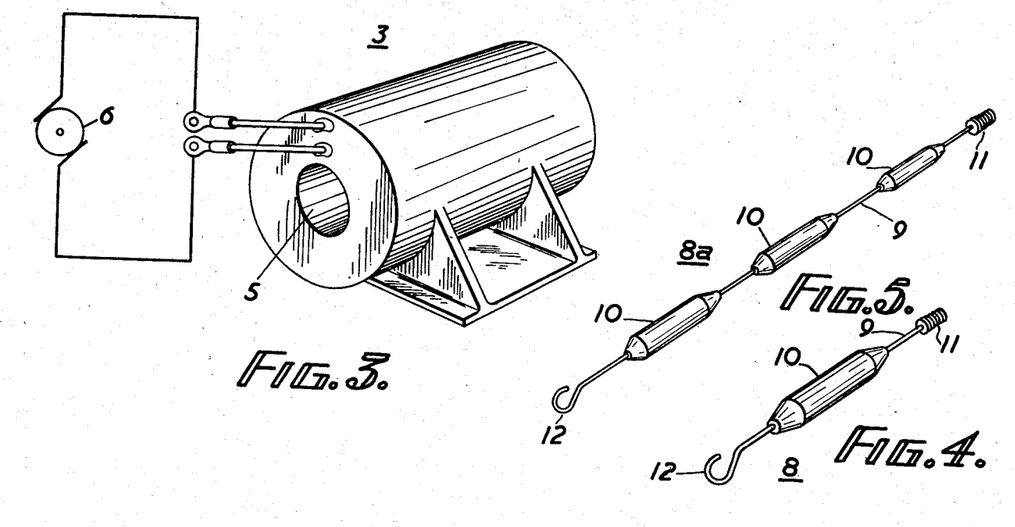
Figure 3 is a perspective view of an electro-magnetic tow-line-threading device comprised in said layout.
Figures 4 and 5 are perspective views of alternative armature devices to be employed with said device of Figure 3.

As shown, the magnet armature device 8 or 8a consists of an elongated steel rod 9 with one or more cylindrical armatures 10 mounted coaxially on it and secured rigidly to it. At one extremity said steel rod 9 is provided with a screw connector 11 by which it is adapted to be connected to the tow line L1, and at the other extremity said steel rod is formed into a hook 12.

Figures 10, 11:
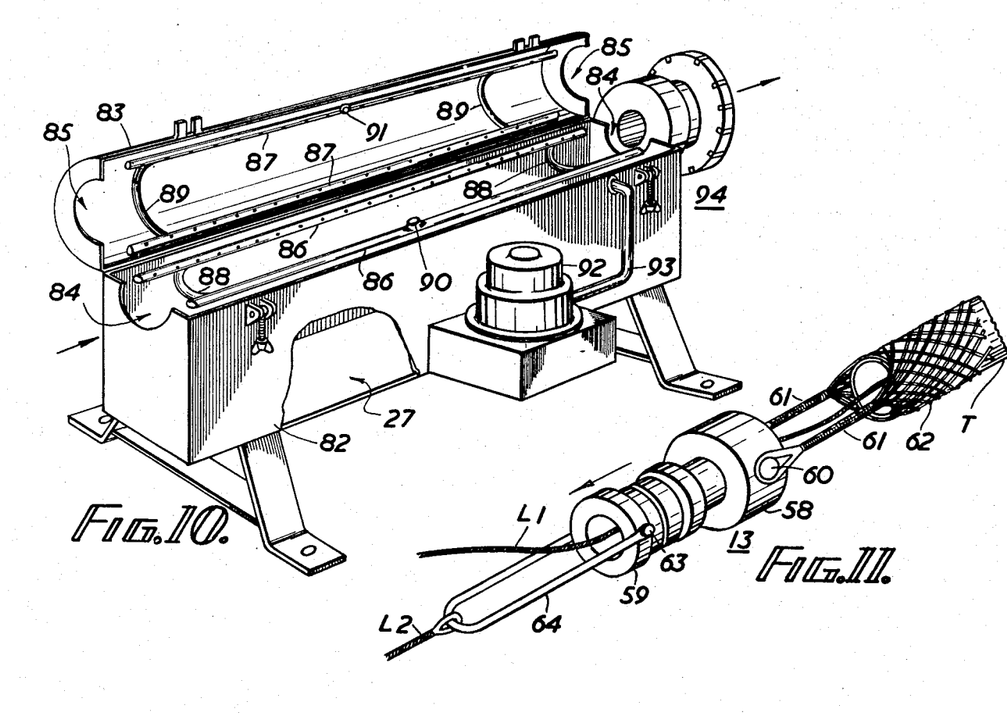
Figure 10 is a perspective view of a de-greasing tank comprised in said layout.
Figure 11 is a perspective view of a connector comprised in said layout, for connecting a tube to a tow-line therefor.

A tube tow line L2 (Figure 11) is then attached to the forward end of the tube T by means of a swivel connector 13 (Figure 11). This connector 13 will be more particularly described hereinafter. It is sufficient at the moment to say that it connects the tube tow-line 12 to the leading end of the tube T without obstructing the free passage of the core tow-line L1 into the leading end of said tube T.

Referring again to Figure 1 a capstan or draw-drum 14 of say ten foot diameter is located upwards of say 250 yards forwardly of the forward end of the tube T at this stage, and this draw drum, by means of the tube tow-line L2, draws the tube T forwardly say 250 yards or any lesser extent according to the desired length of the required cable. During this operation the magnet system of the device 3 is energised, and the armature device 8 or 8a will therefore be held stationary and the core tow-line L1 will be drawn into the tube T as said tube is drawn forward as described.

The tube T when drawn forwardly in this way is drawn along a continuous, rigid, smooth trough 15 (Figure 7) fitted with closely spaced free rollers 16, which trough is provided between the region of the guide roller 7 and the region of the draw drum 14. This trough and its rollers supports the tube with a minimum of friction.

A second and narrower trough 17, suitably located alongside the main trough 15 is employed to locate the core tow line L1, and it will be understood that the said core tow line lies in this trough 17 and is progressively taken into the leading end of the tube as the latter is pulled forwards along its trough 15. These two troughs are embodied in a structure illustrated in Figure 7.

When the draw drum 14 is stopped, if the tube T is initially in discontinuous lengths, each not greater than the total length of the track, the rear end of the first length will be just forwardly of the guide roller 7, and the armature device 8 or 8a together with the end of the core tow line L1 will be outside the rear end of this first length of tube. If the tube is in one continuous length, equal to multiples of the length of the track, it is now severed at a point just in front of said guide roller 7, and the severed ends are separated by taking a short pull with the draw-drum 14 on the leading tube portion. If the tube is initially in discontinuous lengths the second length will be now brought out through the straightening device 2, magnet device 3 and guide roller 7. If the tube was initially continuous the second length (now severed from the first) will be already in that position.

The armature device 8 or 8a is now disconnected from the core tow line L1 and, if the tube T was initially discontinuous, the armature device is inserted in the forward end of the second length of tube.

If the tube T was initially continuous said armature device will already be in the forward end of the second length of tube.

The forward end of the second length of tube is now attached to the rear end of the first length of tube by means of a linking connector 18, hereinafter called a coupler. This coupler 18, which is illustrated in Figures 12 and 13 is of such a construction as to allow the end of a core C for the first length of tube to pass through it into the rear end of said first length, and also to allow a core tow line L1 for the second length of tube to pass through it into the forward end of said second length.

Figure 6:
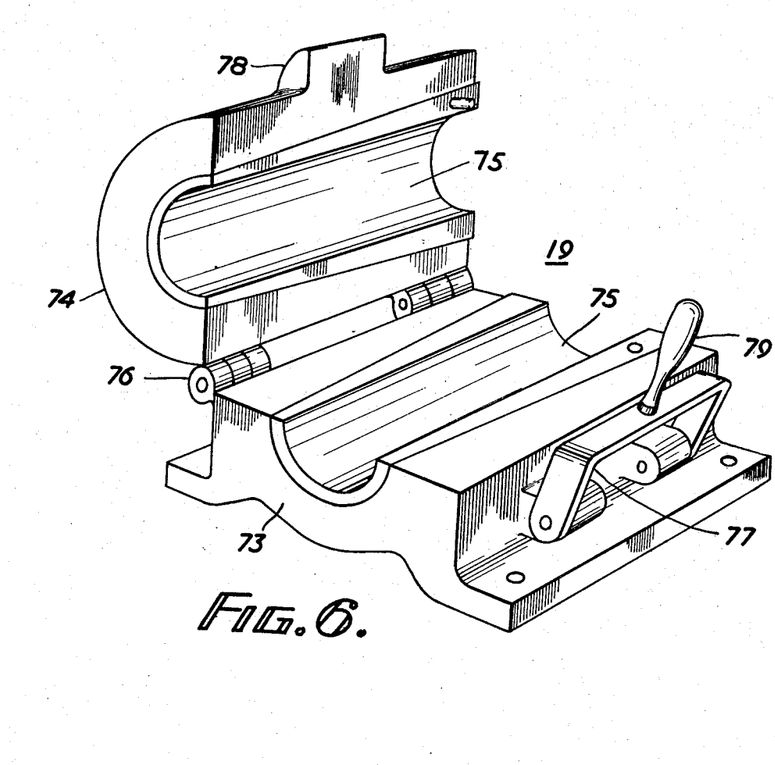
Figure 6 is a perspective view of a clamp comprised in said layout of Figure 1.

Referring again to Figure 1, a fixed clamp 19 (see also Figure 6) is then clamped to the rear end of the first length of tube and said first length is tensioned by means of the draw-drum 14.

Figures 12, 13:
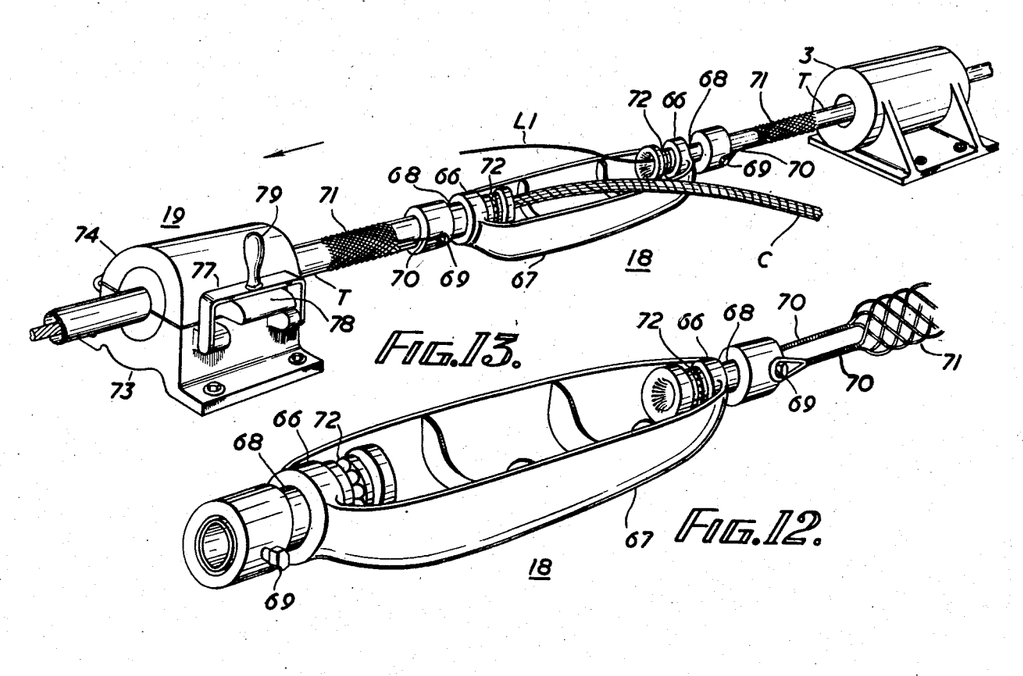
Figure 12 is a perspective view of a connector comprised in said layout for connecting two tubes to each other.
Figure 13 is a similar view, to a smaller scale, of said connector, together with the tow-line-threading device of Figure 3, the clamp of Figure 6 and other parts, shown at a given stage in the process.

The rear end of the core tow line L1, which is in the first length of tube, is now attached to the forward end of the length of core C which it is desired to cover, and the core tow line is drawn from its forward end through said first length of tube, thereby pulling the core C through said first length (see Figure 13).

During this operation, referring again to Figure 1, the core may be paid off from a drum 20 located beside the track at the appropriate position adjacent to the rear end of the first length of tube. The pulling of the core tow line L1 through said first length of tube may be effected by means of an auxiliary capstan or winch (not seen) located at any convenient place at the side of the track adjacent to the front end of said first length of tube, a pulley or pulleys 21 being provided if necessary for guiding said core tow line to said capstan.

An automatic trip may be provided if required, which stops said auxiliary capstan when the appropriate length of core has been drawn through.

When this threading is completed, the rear end of the core tow line L1 is disconnected from the core C and is clipped on to an endless rope conveyor 22 and said line L1 is returned to the feeding end, supported continuously along its length by the aforesaid trough 17.

Figures 8, 9:
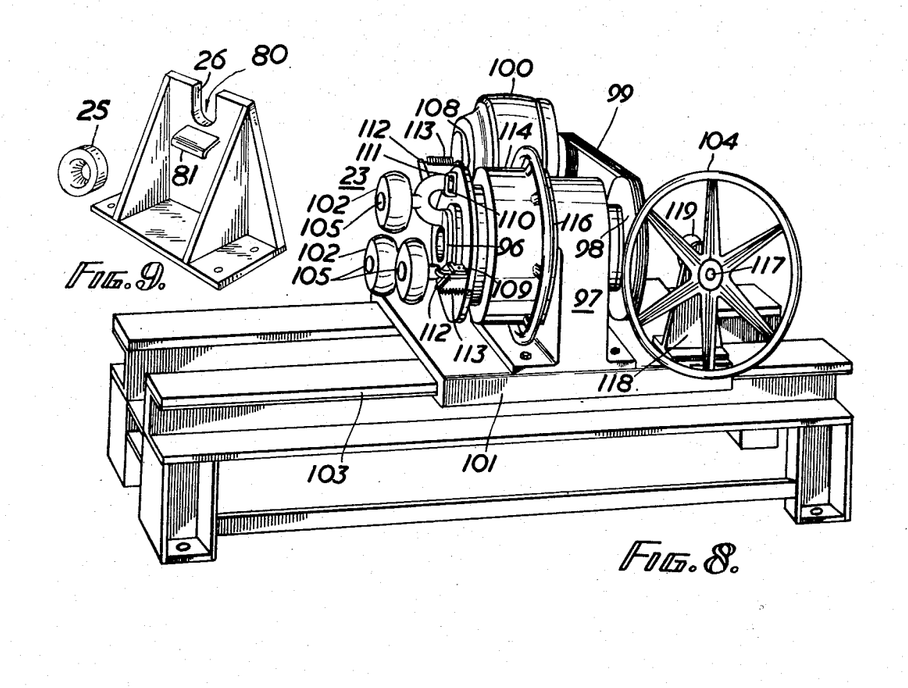
Figure 8 is a perspective view of a swaging machine comprised in said layout.
Figure 9 is a perspective view of a sinking die comprised in said layout, together with its stand.

The clamp 19 is now unclamped from the rear end of the first length of tube and the draw-drum 14 is operated to draw said first length of tube forwardly until its forward end is adjacent to a swaging machine 23 (see also Figure 8).

Through the aforesaid coupler 18, this operation also draws the second length of tube forwardly and starts to lay it out in the trough 15. At some suitable momenet before this operation, a second core tow line L1 has been passed through the coupler and attached to the armature device 8 or 8a within the second length of tube so that as said second length of tube is laid out on the trough, the second core tow line progressively enters said second length of tube.

This stage of the operation is clearly illustrated in Figure 13 which shows the rear end of the first core C still projecting from the rear end of the first length of tube, while the second tow line L1 is entering the forward end of the second length of tube.

Referring again to Figure 1 the leading end of the first length of tube is then drawn through the aperture of the swaging machine 23 and a fixed clamp 24 which is similar to the clamp 19 is applied to said tube just behind said swaging machine. The tension is then relaxed by slightly reversing the draw drum 14 and the swivel connector 13 is detached from the tube, after which the forward end of the tube is swaged and the sinking die 25 slipped on. The tube tow line L2 is then re-attached to the forward end (now reduced) of said first length of tube in any suitable way and the clamp 24 is released.

The draw drum 14 is now operated to draw the first tube length forwardly again. This brings the sinking die 25 up against its stand 26, after which said first tube length is progressively drawn through said sinking die and is thereby reduced or sunk so as to fit as closely as may be required round the core C. Between said sinking die 25 and the draw drum 14 is a degreasing bath 27 (see also Figure 10) which serves to remove from the sheath all trace of the lubricant used in the sinking.

During the operation of sinking the first length of tube, the laying out of the second length of tube and the insertion of the second core tow line L1 into it continues.

When the second length of tube is fully laid out, the third length of tube is brought into position (either by bringing it forward if the initial tube is discontinuous, or by severing it from the second length if the initial length is continuous) in the same manner as above described in connection with the second length of tube.

The operations above described in connection with the first and second lengths are then repeated with the second and third; that is to say, said second and third lengths are connected by means of a coupler 18 and a core C is threaded into the second length of tube in the same manner as above described in connection with the first length of tube. A core tow line L1 is then inserted into the third length of tube (by recommencing the operation of the draw-drum 14) in the same manner as above described in connection with the second length of tube, the original core tow line of the first length of tube being used for this purpose.

This operation of the draw drum is continued until the coupler 18 between the first and second lengths of tube passes through the swaging machine 23 and arrives at the sinking die 25.

At this point the clamp 24 is applied to the leading end of the second length of tube and the tension on the tubes is relieved by slight reversal of the draw-drum 14. The said coupler 18 between the first and second lengths is then removed, whereupon the draw-drum is restarted for completing the sinking of the first length of tube.

The sinking die 25 is then removed and the forward end of the second length of tube is swaged down and has said sinking die slipped on to it just as described in connection with the first length of tube. A flexible rope connection 28 (see Figure 14) is then fitted between the rear end of the first length and the forward end of the second, and, following release of clamp 24, the sinking of said second length, together with the further insertion of the core tow line into the third length is proceeded with.

Alternatively, if the swaging machine 23 will not permit the coupler 18 between the first and second lengths of tube to pass through it, the draw drum is stopped when said coupler 18 reaches said swaging machine. The clamp 24 is then applied to the leading end of the second length of tube and the tension on the tubes is relieved by a slight reversal of the draw drum 14. The said coupler 18 between the first and second lengths is then removed and is replaced by the flexible rope connection 28.

The clamp 24 is then released and the forward end of the second length of tube is drawn into the swaging machine, following which the clamp 24 is reapplied and the tension is then again relieved by a slight reversal of the draw drum 14.

The said flexible rope connection 28 between the first and second lengths is then removed together with the woven wire sheaths 95, whereupon the draw drum is restarted, completing the sinking of the first length of tube.

The situation is now as before at the completion of the sinking of the first length of tube, and the sinking of the second length together with the further insertion of the core tow line into the third length is proceeded with as before.

Referring again to Figure 1, the finished cable passes from the draw drum 14 on to a reeling drum 29. It will be understood that, the tube tow line L2 having left the draw-drum 14 and led a portion of the finished cable on to said draw-drum, the draw-drum pulls direct on the cable itself. Said tube tow line L2 then passes to said cable reeling drum 29, and, having led the cable on to said reeling drum, said tube tow line has completed its purpose and is disconnected and reeled on to its own small reeling drum, not shown.

It will now be seen that the procedure can be repeated indefinitely with any number of lengths of tube T. It will be seen that only two core tow lines L1 are required, which are used alternately, each one being conveyed back by the rope conveyor 22 to the feed end when it has fulfilled its duty of threading a core C through a length of tube.

We prefer to provide two auxiliary capstans or winches (not shown) located side by side beyond the pulleys 21, which are used alternately on the two core tow lines L1, and beyond said capstans are respective reeling drums for said two tow lines.

Suitable clutches are fitted to throw each of said capstans into and out of gear as required.

Thus, while an auxiliary capstan is in use pulling a core C into a tube length by means of one core tow line L1, the other core tow line may be returned from its reel to the feed end by means of the rope conveyor 22.

Referring again to Figure 1, a means indicated at 30 for indicating the tension of pulling in the core is provided and also a tube measuring device 31, a core measuring device 32 and a cable measuring device 33. Communication between distant operators at the two ends of the plant is conveniently contrived by means of microphones 34 and loud speaking telephones 35.

It will be seen that a minimum of two couplers 18 are required, and one or two additional ones are in fact necessary in order to be in a position to effect processing of cable lengths which are individually shorter than the distance between the feed end and the sinking die.

Figure 1:
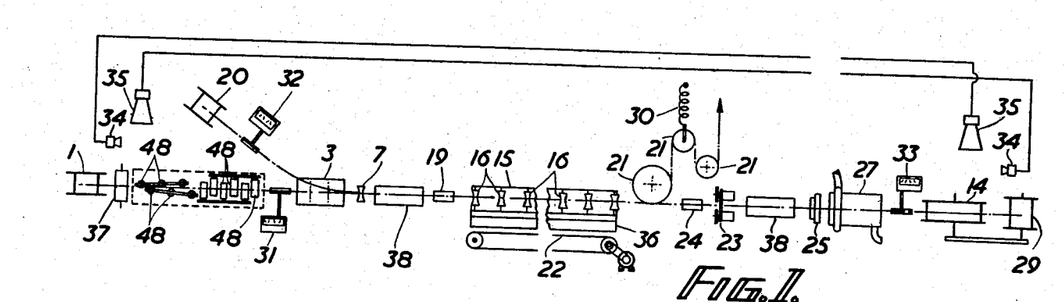
Figure 1 is a schematic plan of the layout involved in one of said processes.
Figure 7:
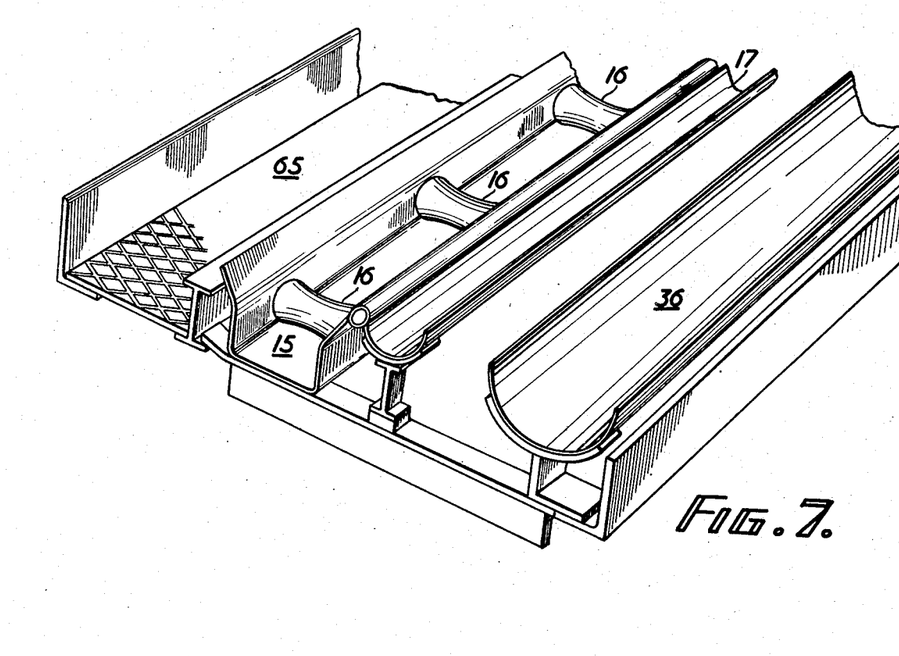
Figure 7 is a perspective view of a structure comprised in said layout for supporting and guiding the tubes and other elements.

The return of the couplers to the feed end for repeated use is conveniently arranged to take place by means of a third trough 36, and the conveyor 22 (see Figures 1 and 7).

It will have been understood that each time a core C is pulled by an auxiliary capstan into a tube length there must be a considerable length of the core left projecting from the rear end of the said tube length, which projecting length is subsequently drawn progressively into the tube length as the latter increases its length during sinking.

Thus, the rear end of the core C must be in process of being drawn through the side of the coupler 18 into the leading tube length, while a core L1 tow line is being drawn through the side of the same coupler into the following tube length. This is clearly illustrated in Figure 13.

The reference 37 (Figure 1) designates a wide roller which is employed in practice to guide the tube between the drum 1 and the tube-straightening machine 2. The reference 38 designates adjustable flat supports for the tube T which I have found it convenient to locate between the roller guide 7 and the clamp 19 and between the swaging machine 23 and the sinking die 25.

Describing now somewhat more particularly certain of the pieces of apparatus comprised in the layout of Figure 1, the tube straightening machine 2 (Figure 2) comprises a number of pulleys 48 between which the tube is passed. The pulleys are arranged in rows on either side of the path of the tube and those on the one side are in staggered relation to those on the other. As will be quite clear from Figure 2 there are two separate sets of said pulleys mounted on two separate structures, one of said sets comprising opposed rows of pulleys above and below the path of the tube so as to be adapted to iron out any lack of straightness in a vertical plane, and the other comprising opposed rows of pulleys left and right of the path of said tube so as to be adapted to iron out any lack of straightness in a horizontal plane. The two structures are essentially the same except for the difference in their orientation.

Figure 2:
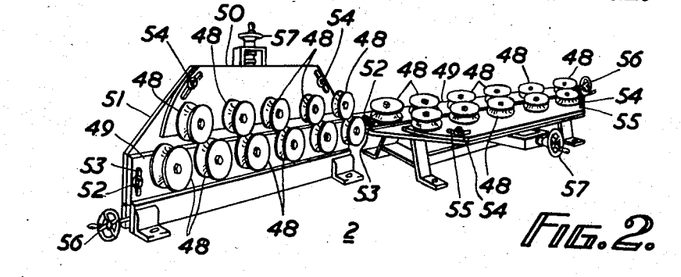
Figure 2 is a perspective view of a tube-straightening machine comprised in said layout.

In the case of each structure the pulleys 48 of each row are in fixed relation to each other but the two rows as a whole are adjustable. That is to say one of said rows (the bottom one in the case of the vertical structure) can be adjusted towards and away from the other row, and the said other row can be adjustably tilted so that one end is inclined towards the first named row. In practice, the two rows are adjusted so as to be either parallel or a little wider apart at the end of entry of the tube than at the end of exit. At the end of exit the rows are just wide enough apart to permit the tube to pass when straight, and thus the tube is progressively straightened in the one plane as it passes between the rows. The pulleys are capable of limited axial movement so that they can conform to lack of straightness in the tube in the plane at right angles to that in which the straightening is being effected. Alternatively elongated rollers without flanges could be employed. The tube, having passed in this way first between the rows of the one structure and then between those of the other structure, will be substantially straightened.

More particularly, in the case of each structure, the row of pulleys which is adjustable towards and away from the other row is mounted on the front face of a plate 49 and the other row is mounted on the front face of a plate 50. These two plates 49 and 50 are mounted with their back surfaces flat against a common base plate 51. In the case of the plate 49 the mounting is effected by means of bolts 52 (one at each end) projecting from the base plate through slots 53 in said plate 49, the slots 53 being straight in such a sense as to enable the required straight adjustment to be made. In the case of the plate 50 the mounting is effected by means of bolts 54 projecting from the base plate through slots 55 in said plate 50, the slots 55 being curved in such a way as to enable the required tilting adjustment to be made. In each case nuts are provided on the bolts for fixing the plates 49 and 50 at any adjusted position.

The actual adjustment of the plate 49 is effected by means of a hand wheel 56 through the medium of a suitable transmission (not seen), and the adjustment of the plate 50 is effected in a similar manner by means of a hand wheel 57.

The swivel connector 13 (Figure 11) comprises two axially spaced annular elements 58 and 59 which are relatively rotatable but are incapable of relative axial movement. The element 58 has diametrically opposite pins or studs 60 on its periphery to which are attached the extremities of leads 61 which extend longitudinally from the outer end of a woven wire sheath 62 adapted to be clamped on the end of the tube T. The element 59 has diametrically opposite pins or studs 63 on its periphery to which are attached the ends of a U link 64 connected, as clearly shown, to the end of the tow line L2. In this way the end of the tube T is coupled axially to the end of the tow line L2, and, at the same time, both said tube and said tow line are free to adjust themselves about their axes and are therefore free from torque. The tow line L1 can pass freely through the two elements 59 and 58 into said tube T.

The joint between the two elements 58 and 59 comprises a ball race which takes the end thrust caused by the tension between the tow line L2 and the tube T, and thus the relative rotation between said two elements is always free despite heavy tension.

The trough structure (Figure 7) is deemed clear from the drawing. It comprises, in one structure, the main trough 15 for the tube T, the trough 17 for the core tow line L1 and the trough 36 for the return of the couplers. Said structure also comprises a catwalk 65.

The coupler 18 (Figures 12 and 13) consists of two spaced coaxial bosses 66 joined by means of an integral elongated boat-shaped part 67. Tubular members 68 pass through the bores of the bosses and are rotatable in said bosses but are restrained against substantial axial movement. Each of these members 68 at its outer end has diametrically opposite pins or studs 69 on its periphery to which are attached the extremities of leads 70 which extend longitudinally from the end of a woven wire sheath 71 adapted, like the aforesaid sheath 62 of the connector 13, to be clamped on the end of the respective one of the tubes T to be coupled together.

Thus the ends of said tubes are coupled together but can adjust themselves about their axes and are therefore free from torque. As seen in Figure 13 the tow line L1 and the core C can pass freely through the respective tubular members 68 into the respective tubes. All races 72 are provided which, as will be clear from the drawing take the end thrust between the tubular members 68 and the bosses 66, caused by the tension of the tubes. As will be seen from Figure 13 the ends of the tubes T may extend into the outer ends of the members 68 and fit into recesses therein to facilitate the guiding of the core and tow line into said tubes and prevent the edges of the tubes abrading said core and tow line.

The fixed clamp 19 (Figure 6) calls for little description. It consists simply of lower and upper clamping elements 73 and 74 which close together and have semi-cylindrical recesses 75 which register to embrace and grip the tube T. The element 73 is fixed to the ground and the element 74 is hinged at 76 to said element 73 to enable it to open and close. For tightening the closure of said element 74, a clamping member 77, in the form of three sides of a rectangle, has its ends pivoted to the element 73 so that its mid portion can be engaged with a cam surface 78 formed on the element 74, to draw, by a cam action, said element 74 down on to the element 73. The member 77 is provided with a handle 79.

The sinking die 25 (Figure 9) is of conventional circular form and is made separate from its stand 26. The stand 26 consists essentially of a massive vertical plate fixed firmly to the ground and having a notch 80 cut out of its upper edge which notch is large enough to give passage to the sunk tube but not large enough to give passage to the sinking die. After the sinking die has been slipped on to the swaged end of the tube, said tube is drawn forwards as heretofore described until the swaged extremity projects through the notch 80 and the sinking die 25 abuts against the stand 26. The die is now restrained and further forward movement of the tube pulls said tube through said die and effects the sinking operation. The reference 81 designates a support mounted on the stand 26 for taking the weight of the die 25.

The degreasing bath 27 (Figure 10) for removing from the tube grease with which it has been lubricated for the sinking operation consists of an elongated tank 82 with a hinged lid 83 of the type which has depth and forms when closed part of the total volume of the container as a whole. The end walls of the tank have semi-circular notches 84 in their upper edges, and the end walls of the lid have complementary semi-circular notches 85 in their lower edges, and when the lid is closed the notches 85 register with the notches 84 so that circular holes are formed in the ends of the closed container as a whole. The tube T is adapted to pass longitudinally through the closed container by way of these holes.

The tank 82 has two perforated longitudinal closed-ended pipes 86 in it, and the lid 83 has two similar perforated longitudinal closed-ended pipes 87 in it, said pipes 86 and 87 being so arranged that when the lid 83 is closed the pipes are parallel to the tube and at intervals around it. The pipes 86 are connected by lateral pipes 88 and the pipes 87 are connected by lateral pipes 89, and co-operating nipples 90 and 91 are provided on respective pipes 86 and 87, which nipples coengage when the lid is closed so as to connect said pipes 86 and 87. Thus all four of the pipes 86 and 87 are connected.

A pump 92 is provided outside the tank 82. This has its inlet in communication with the degreasing liquid in the bottom of the tank and its outlet connected, by way of a pipe 93 with one of the pipes 86. Thus, when the lid 83 is closed and the tube T is passing through the closed container and the pump 92 is in operation, liquid will be taken from the bottom of the tank and delivered to the four pipes 86 and 87 from which it will be sprayed onto the tube after which it will drop back into the tank.

A gland with snugger is provided (designated in general by the reference 94) through which the tube passes on leaving the container. This makes a close sliding fit with said tube and effects removal of the degreasing liquid.

Figure 14:
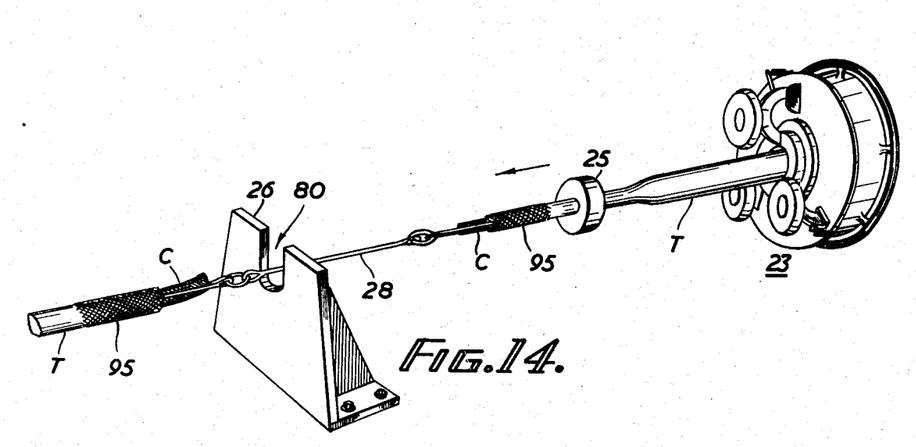
Figure 14 is a perspective view of the essential part of the swaging machine of Figure 8 together with the sinking die and stand of Figure 9 and other parts, shown at another stage in the process.

With reference to Figure 14 it will readily be seen that the flexible rope connection 28 between the two tubes T is connected to said tubes by means of woven wire sleeves 95 equivalent to those 62 and 71 heretofore described.

Figure 8A:
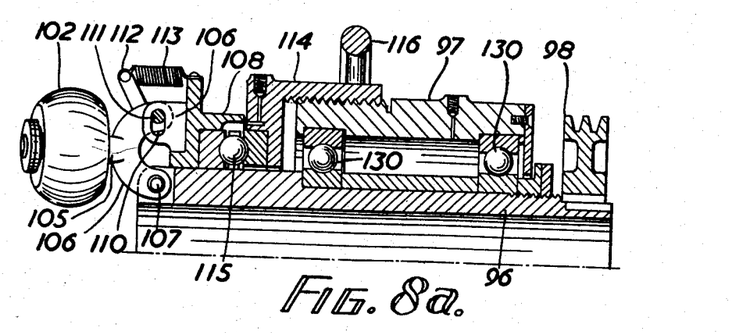
Figure 8a is a half longitudinal section through the operative part of the swaging machine of Figure 8.
Figure 8B:
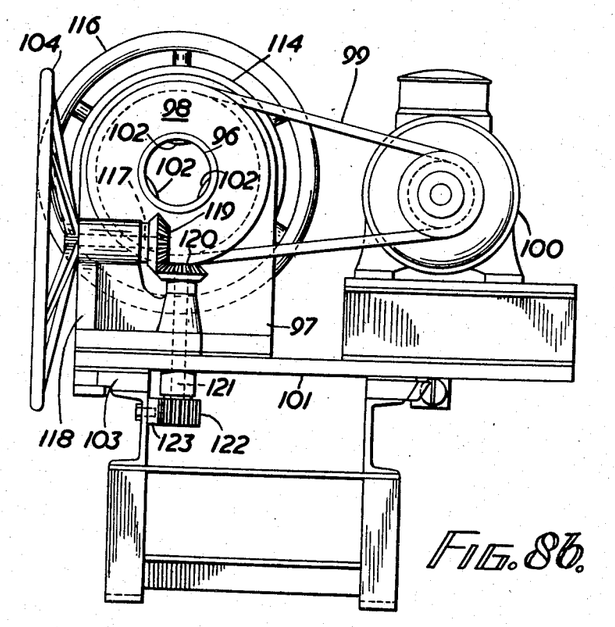
Figure 8b is an end view of said swaging machine looking from the right of Figure 8.

Describing now the swaging machine 23 (Figures 8, 8A and 8B). This machine consists of a hollow mandrel 96 which is rotatably mounted through ball bearings 130 in a stationary body 97. The two ends of the mandrel project beyond said body and at one of its projecting ends said mandrel has a pulley 98 mounted on it whereby, through a belt 99 said mandrel is adapted to be driven by an electric motor 100 which is mounted on the same base 101 which supports said body 97.

Said mandrel at its other end has mounted on it at intervals of 120 degrees three barrel-shaped steel swaging rollers 102. These rollers 102 are, roughly speaking, in a common plane at right angles to the axis of the mandrel and beyond the end thereof, and they have their axes roughly parallel to the axis of the mandrel and at a common radius therefrom. As well as being constrained to rotate bodily with the mandrel, they are freely rotatable about their individual axes.

The base 101 is mounted on a fixed table 103, and is adapted to be slidably traversed along said table, in a sense longitudinally of the axis of the mandrel, in response to the rotation of a hand wheel 104.

In operation the mandrel 96 is set in rotation by the motor 100 and the tube whose end is to be swaged is passed through said mandrel so that its end is brought to the three rollers 102. The hand wheel 104 is then operated in the direction to draw the rollers longitudinally over the end of the tube and the said rollers, which are rotating bodily with the mandrel, will now roll round the tube and reduce it according to the radius at which they are set with respect to the axis of the mandrel, the length of the tube which is reduced being, of course, determined by the extent to which the hand wheel 104 is operated.

In order that the extent of the reduction of the tube can be preselected the rollers 102 are adjustable towards and away from the axis of the mandrel.

More particularly each roller 102 is mounted, through ball bearings on a relatively stationary axle 105 which forms an integral part of a bracket 106 which is pivoted, by means of a pivot pin 107, to the end edge of the hollow mandrel 96 in such a way that as said bracket rocks about said pivot pin it moves in a radial plane and said roller is moved towards and away from the axis of the mandrel.

For simultaneously adjusting the three brackets 106 about their pivot pins 107, an annular member 108 is mounted on the mandrel 96 between the body 97 and the three brackets 106, which annular member rotates with, but is longitudinally slidable with respect to, said mandrel. This annular member is formed with three lugs 109 in radial planes which have slots 110 in them running at right angles to the axis of the mandrel. These slots are radially outwards with respect to the respective pivot pins 107 and each bracket 106 has a pin 111 projecting laterally from it which engages slidably in a respective slot 110.

It will now be seen that as the member 108 is slid longitudinally left and right along said mandrel the brackets 106 will be rocked to and fro about their pins 107, the pins 111 sliding in the slots 110, and the rollers 102 will be moved towards and away from the axis of the mandrel.

Each bracket 106 has an arm 112 integral with it which is connected by a tension spring 113 to the annular member 108 so that the rollers 102 are biased outwards and the member 108 is accordingly biased towards the body 97. Said body 97 has an adjusting sleeve 114 mounted in screwed relation on its circumferential periphery, and the rearward bias of the annular member 108 brings the same into abutment with said sleeve 114 (with end-thrust ball bearings 115 in between as will be clear from the drawings). Thus by rotating said sleeve 114 and thereby adjusting the same longitudinally, the longitudinal adjustment of the annular member 108 and therefore the in and out adjustment of the rollers 102 is effected. Said sleeve 114 is provided with an integral hand wheel 116 by which its rotation is adapted to be effected.

For effecting the aforesaid traverse by operation of the hand wheel 104, said hand wheel is mounted fast on an axle 117, which is horizontal and at right angles to the direction of slide of the base 101, and which runs in a bearing in a bracket 118 rigidly mounted on said base 101. Said axle 117 carries a bevel gear 119 which meshes with a bevel gear 120 fast on a vertical axle 121 which also runs in a bearing carried by the bracket 118. The lower end of the axle 121 has a pinion 122 fast on it, which pinion is in mesh with a rack 123 on the fixed table 103 parallel to the direction of slide of the base 101. Thus by rotating the hand wheel 104 the base 101 together with the whole swaging machine and the motor 100 is traversed along said table 103 as stated.

Figure 15:
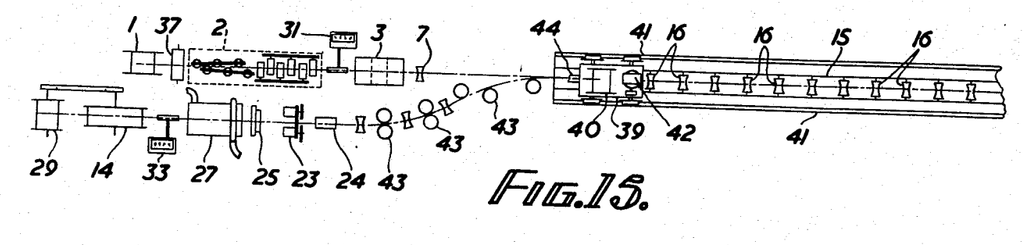
Figure 15 is a schematic plan of the layout involved in another process according to the invention.
Figure 16:
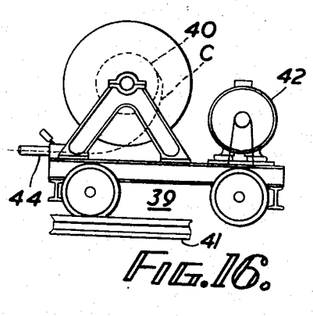
Figure 17:
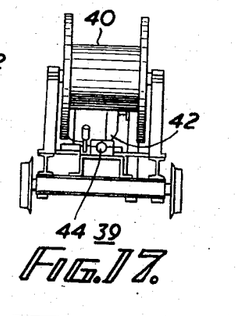
Figure 17 an end elevation of a device comprised in said layout of Figure 15.

Describing now with reference to Figures 15, 16 and 17 a second process in accordance with the invention, the tube T, as before, is wound off a drum 1, through a straightening machine 2, through a tow-line-threading device 3, over a guide roller 7, and on to a laying out trough 15 with rollers 16. Instead, however, of the tube being drawn on to the trough 15 by means of the draw drum 14 of Figure 1, and the core tow line being simultaneously threaded into said tube, said tube is drawn on to said trough by means of a towing carriage 39 and simultaneously the core C whose end is attached direct to the armature device 8 or 8a is payed off a drum 40 mounted on said towing carriage and progressively enters the tube under the action of the device 3 as said tube is pulled along by said carriage. In this way both the tow lines L1 and L2 are dispensed with. Said carriage runs on rails 41 on each side of said trough 15 and has a driving motor 42.

Assuming the tube is wound on the drum 1 in a continuous length equal to some multiple of the maximum length of travel of the carriage, when the required length of tube has been laid out the tube is severed at a point coinciding with the position of the junction between the armature device 8 or 8a and the core C and said core is detached from said armature device, the armature being left in the rear portion of the tube held by the continuously energised device 3 in readiness for the next operation. The position at which the junction between armature and core is made and severance of the tube takes place is so selected as to facilitate the attachment of the forward end of the rear portion of the tube to the carriage after the carriage has been drawn back into the starting position.

The rear end of the front tube portion which has the core in it is now directed or guided, by suitable means indicated at 43, rearwardly towards the sinking die 25 which is situated on a line parallel to and conveniently beside that along which the straightening has taken place.

This end of the tube is first suitably prepared, as described in connection with the first process, by means of a swaging machine 23, while held by a fixed clamp 24, and is then inserted into the die 25 through which it is drawn by means of a draw drum 14 equivalent to that of Figure 1. For this operation the end of the tube will of course be connected to a suitable rope or line and the latter will be first wound on to the draw drum, after which the tube (now sunk on to the core to form the finished cable) will be wound direct on to said draw drum. The cable led by the said rope or line, subsequently passes on to the cable reeling drum 29. As in the preceding process the cable, between the sinking die 25 and the draw drum 14, passes through a degreasing bath 27, and an indicator 33 is also provided.

During this operation the tube remains attached to the carriage 39 and thereby draws the latter back to its starting position close to the device 3. The tube is then detached from said carriage 39 and the core cut, leaving a short piece of said core protruding from said tube to allow for the small increase in length of the short portion of the tube remaining between the carriage and the sinking die.

The end of the core on the carriage 39 is then connected to the armature device (which is already in the forward end of the second portion of the tube) and the said forward end of said second tube portion is connected to the carriage, and the whole process is repeated until another length of cable is produced.

The amount of core initially on the drum 40 of the carriage can be sufficient to produce a plurality of lengths of finished cable. The length required for each successive length of cable will not be fully unwound from the drum during the operation of laying out and straightening the tube, owing to the fact that the length of the tube extends during the sinking process. Thus, when the tube is being drawn in the reverse direction through the sinking die 25, its increasing length will cause the drum of core 40 on the carriage to continue to unwind slowly and additional core to enter the tube.

More particularly, the carriage 39 has a tubular extension 44, which is adapted to be connected coaxially to the end of the tube and through which the core, from the drum 40 passes into the interior of the tube. In initiating the operation on the first length of tube, the end of the tube having been passed through the straightening device 2 and the threading device 3, the armature device 8 or 8a is inserted into the tube in the appropriate position with respect to the device 3, and the latter is then energised.

The core is then passed from the drum 40 through the tubular extension 44 to the outside, where it is coupled to the armature device within the tube, and said tube is then connected to the tubular extension 44. The carriage then operates to lay the tube out as described. In the case of subsequent lengths of tube the procedure is the same except that the armature device 8 or 8a is already within the tube.

The pulling, through the sinking die 25 of each length of tube subsequent to the first can be effected by means of the preceding length in the manner indicated in Figure 14. Each length can also be used to draw the succeeding length up to the sinking die.

Figure 18:
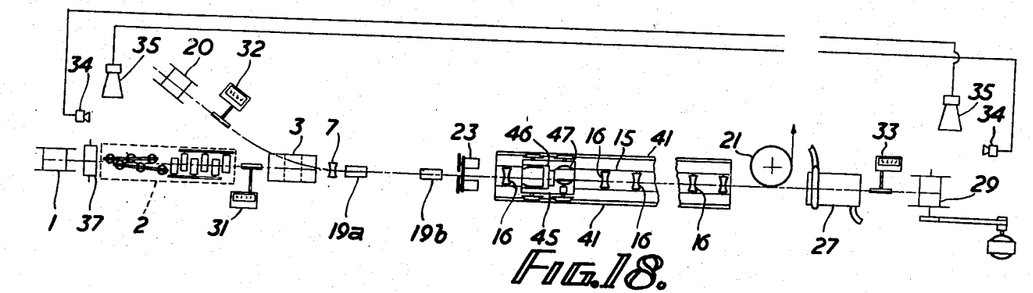
Figure 18 is a schematic plan of the layout involved in a third process according to the invention.
Figure 19:
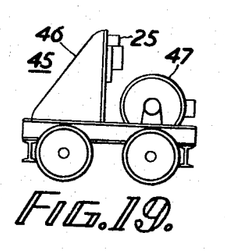
Figure 20:
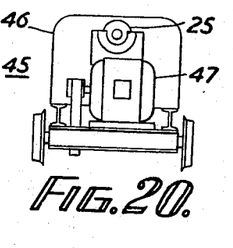
Figure 20 an end elevation of a device comprised in said layout of Figure 18.

Describing now, with reference to Figures 18, 19 and 20 a third process in accordance with the invention, the procedure, up to the threading of the core into the tube is the same as in the first embodiment except that the draw drum 14 is dispensed with, the reeling drum, upon which the finished cable is to be wound, being utilised for the operation of laying out and straightening the tube.

It will be seen that, as in the second process, rails 41 are provided on each side of the trough 15. On these rails a carriage 45 runs, which carriage carries a die stand 46 similar to the die stand 26 of Figure 9. Also the swaging machine 23 is located just rearwardly of the rear end of the trough 15, and, between the guide roller 7 and said swaging machine two spaced fixed clamps 19a and 19b are located. During the aforesaid laying out operation, the tube passes through the aperture of the swaging machine 23 and also through the aperture of the die stand 46, the latter being at the rear end of the trough 15, and it will be appreciated that the core tow line L1 must have been led through the said apertures of said swaging device and die stand prior to the laying out operation.

The severing of the tube (if it is continuous) or the stopping of the rear end of the tube (if it is discontinuous) prior to the threading of the core takes place mid-way between the two clamps 19a and 19b, and the clamp 19b is tightened on to the rear end of the first length of tube to enable the core threading to take place.

In the present process the core is drawn through the tube until enough of it has emerged at the leading end to correspond to the amount by which the tube will increase its length during sinking. The core at the rear end is cut off flush with the rear end of the tube.

The clamp 19b is now released and the first length of tube is drawn forward until its rear end is in the swaging machine, and this end is then swaged after which the tube is again drawn forward slightly until its rear end is just past the die stand 46, whereupon the sinking die 25 is slipped on. The rear end of the first length of tube is then connected to the forward length of the second tube by means of a connector (such as the connector 18) which allows a second core tow line L1 to enter the forward end of the second tube length.

The clamp 19a is now applied to the forward end of the second length of tube and the carriage 45 with its die stand 46 is driven forwardly along the track 41 by means of its motor 47, so that said die stand picks up the die 25 and draws it forwardly along the first length of tube thereby effecting the sinking operation upon said first length.

After completion of the sinking of the first length of tube and the freeing of the die 25, which latter requires the temporary detachment of the tube tow line, the clamp 19a is released from the leading end of the second length of tube, and the first length of finished cable is reeled on to the drum 29, thereby effecting the laying out of the second length and the threading therein of the core tow line.

The carriage 45 is then returned to the rear end of the track to prepare for the sinking of the second length of tube. In returning, said carriage takes with it the first core tow line for use with the third length of tube.

It will now be clear that the cycle of operations described can be continued and an indefinite number of finished cables produced.

It is to be understood that the processes described, and particularly the apparatus employed therein, can be varied in many ways without departing from the scope of the appended claims. For example in the embodiment of the invention first described it would be possible, as an alternative to the device 3 and armature 8 or 8a for threading the core tow line into the tube, to attach said core tow line to a mandrel and to insert said mandrel into the end of the tube, said tube, when subsequently drawn forwardly being pulled through a die giving a slight reduction such as may be used for straightening the tube.

This mandrel is of too great diameter to pass with the tube through the reducing die and it is so shaped that without jamming it will be held back by the die as the tube is pulled through the latter. The tube will thus run past the mandrel through the die, the mandrel being in fact held back by the stationary, shouldered portion of the moving tube just prior to the entry into the die.

Again, as an alternative to the capstan or draw drum 14 of the first and second methods described, there may be employed a machine of well-known design which operates to grip the cable with a pair of arms which travel forwardly a short distance while the grip is held, there releasing and returning with a reciprocating motion to repeat the process.

By means of a plurality of pairs of arms operating in succession, a substantially constant forward motion of the cable is achieved.

What I claim is:
1. A method of assembling an electric cable core in a metallic sheathing, which comprises providing an electric cable core, a metal tube of larger diameter than the assembled sheathing and a tow line one end of which has magnetic properties, inserting said end of the tow line in the forward end portion of the metal tube, retaining said end of the tow line against longitudinal movement by creating a magnetic field in the metal tube adjacent said end of the tow line to magnetically hold said end in the magnetic field, while the tow line end is so retained, imparting longitudinal movement to the metal tube relative to and in a direction from the fixed end of the tow line along the said tow line to telescope the metal tube over the tow line, attaching the electric cable core to one end of the tow line, and drawing the electric cable core into the full length of the metal tube by the tow line.

2. A continuous method of assembling successive lengths of electric cable cores in metallic sheathing, which comprises providing a plurality of lengths of electric cable cores and metal tubes of a diameter larger than the required diameter of the assembled sheathing and at least one tow line, coupling the rear end of a first length of metal tube in spaced axial alignment to the forward end of a second length of metal tube, threading a length of electric cable core into the first length of metal tube by means of a tow line, inserting one end of a tow line into the forward end portion of the second length of metal tube, retaining said end of said last-named tow line against longitudinal movement, pulling said first length of metal tube and thereby said second length of metal tube forwardly to thereby draw said last-named tow line into said second length of metal tube, attaching the rear end of said second length of metal tube to the forward end of a third length of metal tube, threading a second length of cable core into said second length of metal tube by means of said last-named tow line, and repeating the cycle of operations.

3. A continuous method of assembling successive lengths of electric cable cores in metallic sheathing, which comprises providing a plurality of lengths of electric cable cores and metal tubes of a diameter larger than the required diameter of the assembled sheathing, and at least one tow line, coupling the rear end of a first length of metal tube in spaced axial alignment to the forward end of a second length of metal tube, threading a length of electric cable core into the first length of metal tube by means of a tow line with a portion of said length of electric cable core extending out of the rear end of the first length of metal tube by way of the space between said first and second lengths of metal tube, inserting one end of a tow line into the forward end of said second length of metal tube by way of said space between said first and second lengths of metal tube, retaining said end of said last-named tow line against longitudinal movement, simultaneously drawing said second length of metal tube forwardly and drawing said last-named tow line into said second length of metal tube through the forward end of said second length of metal tube, attaching the rear end of said second length of metal tube to the forward end of a third length of metal tube, threading a second length of cable core into said second length of metal tube by means of said last-named tow line, and repeating the cycle of operations.

4. A continuous method of assembling successive lengths of electric cable cores in metallic sheathing as claimed in claim 2, wherein the end of the tow line inserted into the forward end portion of the second length of metal tube has magnetic properties and is retained against longitudinal movement by creating a magnetic field in said second length of metal tube adjacent said end of said tow line to magnetically hold said end in the magnetic field.

PHILIP MASSEY HOLLINGSWORTH.

References Cited in the file of this patent
UNITED STATES PATENTS

| Number | Name | Date |
| --- | --- | --- |
| 1,227,346 | Trood | May 22, 1917 |
| 1,540,435 | Tebo | June 2, 1925 |
| 2,386,119 | Jack | Oct. 2, 1945 |
| 2,470,262 | Payzer | May 17, 1949 |